United States Patent
Schmitt

(10) Patent No.: US 11,183,941 B2
(45) Date of Patent: Nov. 23, 2021

(54) METHOD TO REDUCE VARIABLE SPEED CONSTANT FREQUENCY POWER CONVERTER LOSSES DURING ABNORMAL OVERLOADS

(71) Applicant: Hamilton Sundstrand Corporation, Charlotte, NC (US)

(72) Inventor: Dwight D. Schmitt, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 453 days.

(21) Appl. No.: 16/182,174

(22) Filed: Nov. 6, 2018

(65) Prior Publication Data

US 2020/0144928 A1    May 7, 2020

(51) Int. Cl.
*H02M 5/458* (2006.01)
*H02P 9/30* (2006.01)
*H02P 101/30* (2015.01)

(52) U.S. Cl.
CPC .......... *H02M 5/4585* (2013.01); *H02P 9/305* (2013.01); *H02P 2101/30* (2015.01); *H02P 2201/01* (2013.01)

(58) Field of Classification Search
CPC ............ H02M 5/40; H02M 5/42; H02M 5/44; H02M 5/453; H02M 5/458; H02M 5/4585; H02M 5/48; H02M 5/45; H02M 5/4505; H02M 5/451; H02M 7/7575
See application file for complete search history.

(56) References Cited

U.S. PATENT DOCUMENTS

| | | |
|---|---|---|
| 4,390,938 A | 6/1983 | Stacey |
| 4,937,723 A | 6/1990 | Rozman et al. |
| 4,956,598 A * | 9/1990 | Recker ................. H02M 5/272 |
| | | 322/28 |
| 5,040,105 A | 8/1991 | Dhyanchand et al. |
| 5,055,765 A | 10/1991 | Rozman et al. |
| 6,784,634 B2 | 8/2004 | Sweo |
| 10,630,164 B1 * | 4/2020 | Bax ......................... H02M 1/44 |
| 10,715,029 B1 * | 7/2020 | Bax ........................... H02J 3/38 |
| 2017/0317630 A1 | 11/2017 | Said et al. |

OTHER PUBLICATIONS

Extended European Search Report for European Patent Application No. 19206973.0, dated Mar. 9, 2020.

* cited by examiner

*Primary Examiner* — Nguyen Tran
(74) *Attorney, Agent, or Firm* — Locke Lord LLP; Scott D. Wofsy; Judy R. Naamat

(57) ABSTRACT

A method of controlling a variable speed constant frequency (VSCF) power converter is provided. The method includes receiving a determination that a sensed AC current output has exceeded a predetermined limit. The AC current output is converted from a DC voltage and has a constant frequency. The DC voltage is converted from a variable frequency AC voltage. The variable frequency AC voltage is generated in response to a mechanical energy input having a varying parameter. The method further includes decreasing the DC voltage in response to a determination that the sensed AC current output has exceeded the predetermined limit.

17 Claims, 5 Drawing Sheets

METHOD TO REDUCE VARIABLE SPEED CONSTANT FREQUENCY POWER CONVERTER LOSSES DURING ABNORMAL OVERLOADS

BACKGROUND OF THE INVENTION

1. Field of the Invention

The present disclosure relates to variable speed constant frequency (VSCF) converter systems, and more particularly to controls of VSCF converter systems, such as for providing AC power to loads by an aircraft engine, and in particular reduction of VSCF converter losses during abnormal overload conditions.

2. Description of Related Art

A power electronic system can include a variable speed constant frequency (VSCF) converter that converts variable frequency power to constant frequency power. The VSCF converter can receive a motive power and output a three-phase regulated voltage fixed frequency AC power. The motive power can be received by a prime mover, such as an aircraft engine. The VSCF converter can include a generator that receives the variable-speed motive power, and converts the motive power into a variable-frequency AC power at an output thereof. An alternating current (AC)/direct current (DC) stage can convert the variable frequency AC power into a DC voltage. A DC/AC stage can convert the DC voltage into a fixed frequency AC power that can be output to an AC bus for use by one or more loads. However, when an abnormal overload current is delivered to the AC bus, the VSCF converter can be under thermal stress. Under such conditions, a conventional VSCF converter reduces the point of regulation (POR) voltage that is delivered to the load(s) as a function of the output current.

Such conventional methods and systems have generally been considered satisfactory for their intended purpose. However, there is still a need in the art for improved power electronic systems, a VSCF converter controller, and method of controlling a VSCF converter. The present disclosure provides a solution for this need.

SUMMARY OF THE INVENTION

The purpose and advantages of the below described illustrated embodiments will be set forth in and apparent from the description that follows. Additional advantages of the illustrated embodiments will be realized and attained by the assemblies, modules, and methods particularly pointed out in the written description and claims hereof, as well as from the appended drawings. To achieve these and other advantages and in accordance with the purpose of the illustrated embodiments, in one aspect, disclosed is a method of controlling a variable speed constant frequency (VSCF) power converter. The method includes receiving a determination that a sensed AC current output has exceeded a predetermined limit. The AC current output is converted from a DC voltage and has a constant frequency. The DC voltage is converted from a variable frequency AC voltage. The variable frequency AC voltage is generated in response to a mechanical energy input having a varying parameter. The method further includes decreasing the DC voltage in response to a determination that the sensed AC current output has exceeded the predetermined limit.

In embodiments, decreasing the DC voltage can include controlling generation of the variable frequency AC voltage.

In embodiments, decreasing the DC voltage can include adjusting a voltage reference signal, wherein the voltage reference signal is compared to the DC voltage as sensed after being converted from the variable frequency AC voltage and before being converted into the AC output, and generation of the variable frequency AC voltage is controlled as a function of a result of the comparison.

In embodiments, the method can further include receiving the sensed DC voltage and comparing the DC voltage to the voltage reference signal.

In embodiments, the method can further include controlling generation of the variable frequency AC voltage as a function of a result of the comparison.

In embodiments, the method can further include receiving the sensed AC current output and comparing in a first comparison the sensed AC current output to the predetermined limit for determining whether the sensed AC current output has exceeded the predetermined limit.

In embodiments, the method can further include receiving a sensed AC voltage sensed after conversion to the constant frequency AC current and before provision to an AC load, comparing in a second comparison the sensed AC voltage to an AC voltage reference signal, and controlling conversion of the DC voltage into the AC current output as a function of at least one of the first and second comparisons.

In embodiments, the predetermined limit is exceeded when the AC current output is more than approximately 1.5 a rated current level that is rated for a load coupled to a load bus that receives the AC current output.

In a further aspect, a VSCF converter is disclosed. The VSCF converter includes an AC/DC conversion stage, a DC/AC conversion stage, and a controller. The AC/DC conversion stage is configured to receive variable frequency AC voltage and convert the variable frequency AC voltage to a DC voltage. The DC/AC conversion stage is configured to convert the DC voltage into an AC current output having a constant frequency. The controller is configured to receive a sensed AC current output from sensing of the AC current output, determine whether the sensed AC current output exceeded a predetermined limit, and in response to a determination that the sensed AC current output has exceeded the predetermined limit, decrease the DC voltage.

In embodiments, the VSCF converter can further include a variable frequency generator configured to output variable frequency signals, wherein decreasing the DC voltage can include controlling generation of the variable AC voltage by the variable frequency generator.

In embodiments, decreasing the DC voltage can include adjusting a voltage reference signal, wherein the voltage reference signal is compared to a the DC voltage as sensed after being converted from the variable frequency AC voltage and before being converted into the AC output, and generation of the variable frequency AC voltage is controlled as a function of a result of the comparison.

In embodiments, the VSCF converter can further include a first comparator configured to receive a sensed DC voltage from sensing the DC voltage and to compare the sensed DC voltage to the voltage reference signal.

In embodiments, the VSCF converter can further include a generator control that can control generation of the variable frequency AC voltage as a function of a result of the comparison.

In embodiments, the VSCF converter can further include a first comparator configured to receive the sensed AC current output and compare the sensed AC current output to the predetermined limit for determining whether the sensed AC current output has exceeded the predetermined limit.

In embodiments, the VSCF converter can further include a second comparator configured to receive a sensed AC voltage that was sensed after conversion to the constant frequency AC current and before provision to an AC load, and further configured to compare the sensed AC voltage to an AC voltage reference signal. The DC/AC stage can be controlled as a function of results determined by at least one of the first and second comparators.

In another aspect, a controller for controlling a VSCF converter is disclosed. The controller includes processing circuits configured to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
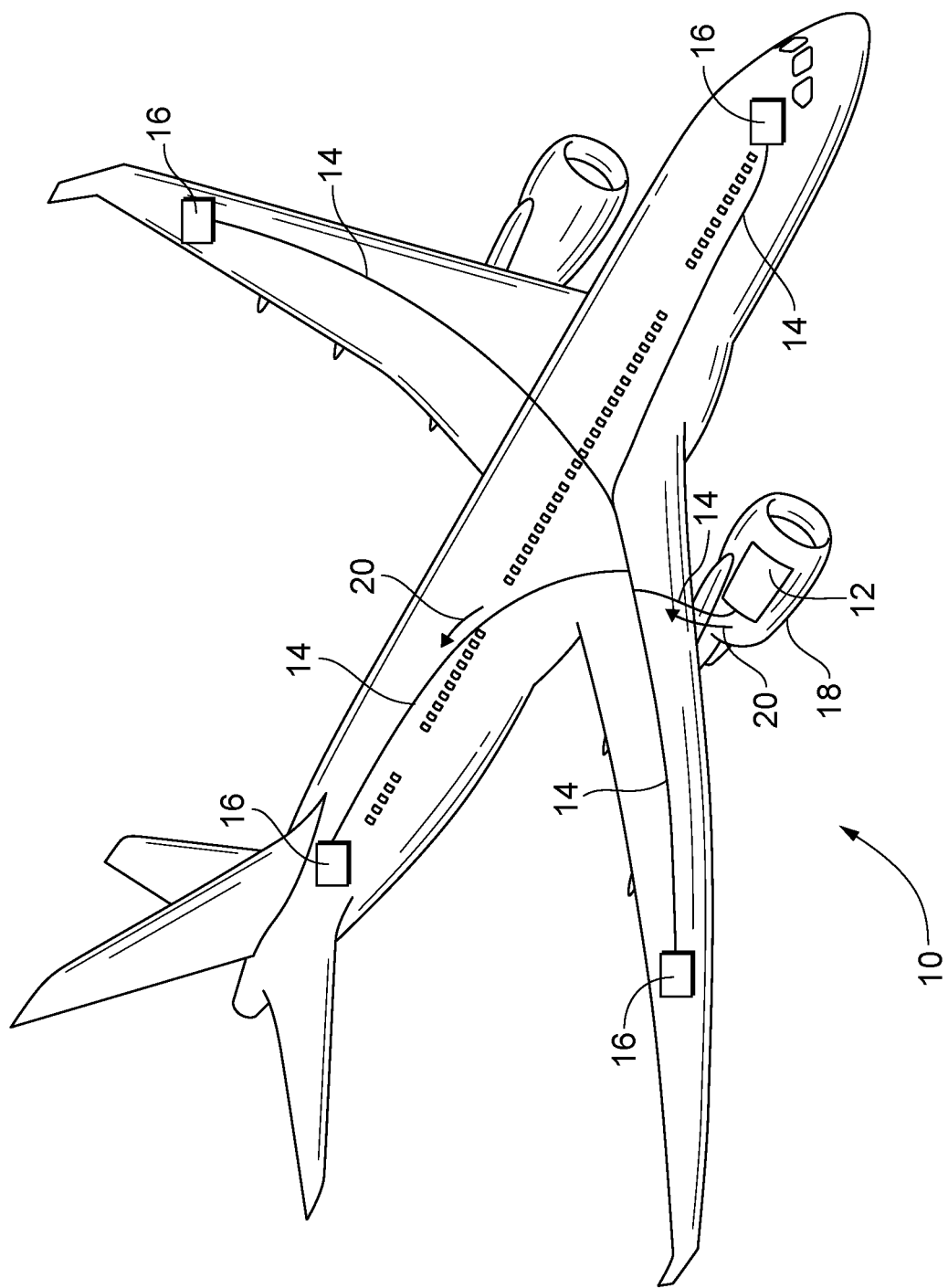
FIG. 1 is a schematic view of an exemplary embodiment of power electronics system of an aircraft configured in accordance with the present disclosure, showing the power electronics system connected to alternating current (AC) bus loads.

Reference will now be made to the drawings wherein like reference numerals identify similar structural features or aspects of the subject disclosure. For purposes of explanation and illustration, and not limitation, a partial view of an exemplary embodiment of power electronic system in accordance with the disclosure is shown in FIG. 1 and is designated generally by reference character 10. Other embodiments of power electronic systems, variable speed constant frequency (VSCF) converter controllers, and methods of controlling a VSCF converter in accordance with the disclosure, or aspects thereof, are provided in FIGS. 2-5, as will be described. The systems and methods described herein can be used in power electronic systems having a VSCF converter, such as a VSCF converter that provides fixed frequency AC power to an aircraft bus, though the present disclosure is not limited to any specific type of VSCF converter or to a power electronic system in general.

Referring to FIG. 1, an electrical system 10, e.g., an aircraft electrical system, is shown. Electrical system 10 includes a VSCF generation system 12, a power bus 14, and AC loads 16. VSCF generation system 12 is operably associated with an engine 18, e.g., an aircraft main engine or auxiliary power unit, and is arranged to provide a flow of electrical power 20 to power bus 14. Power bus 14 is connected to respective power-consuming AC load 16 to provide electrical power 20 to AC loads 16. Although an aircraft electrical system is shown and described herein it is to be understood and appreciated that other types of electrical systems can also benefit from the present disclosure.

Figure 2:
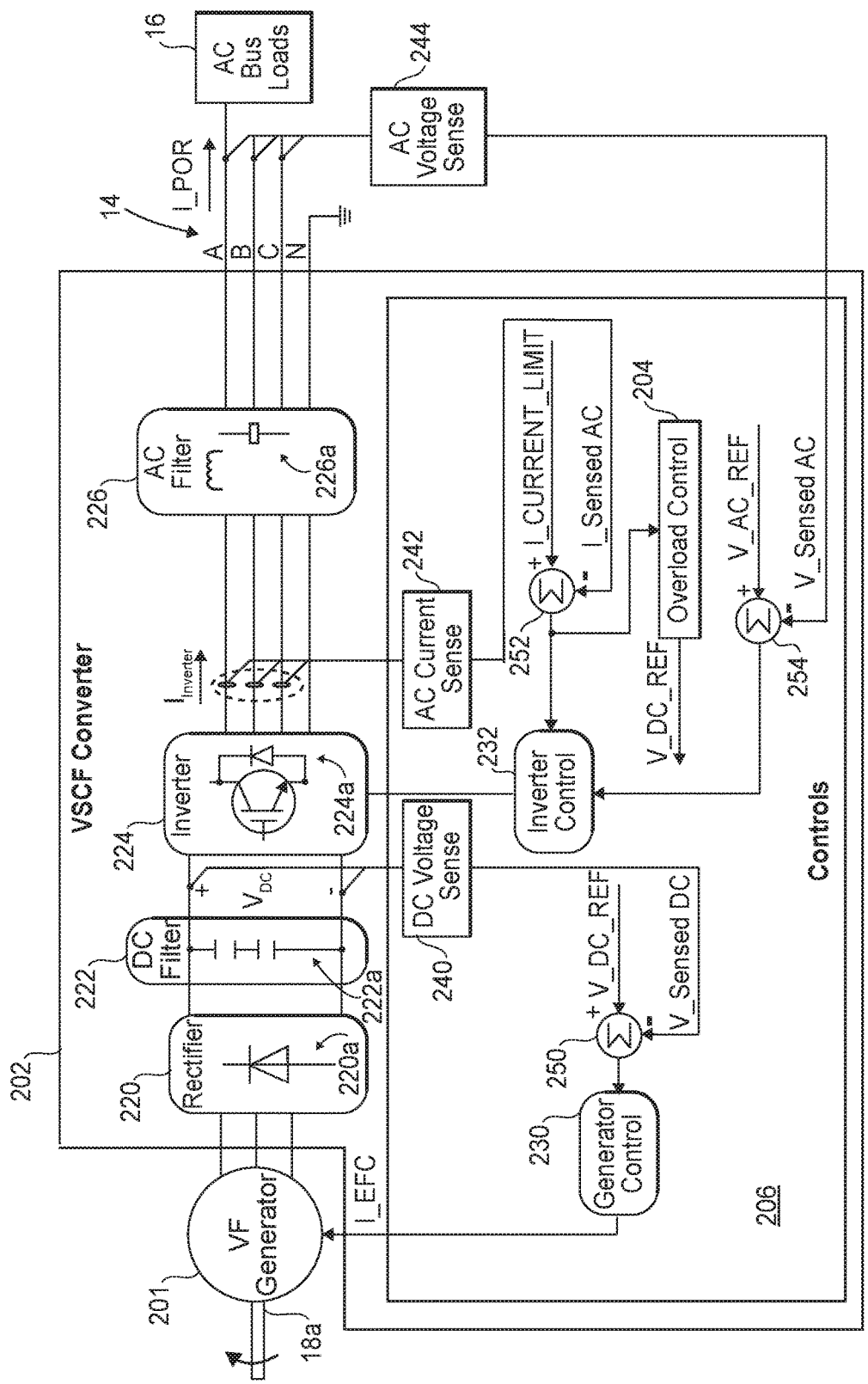
FIG. 2 is a detailed schematic view of an exemplary embodiment of a power electronics system in accordance with the present disclosure.

With additional reference to FIG. 2, a schematic diagram of an example embodiment of the electrical system 10 is shown, including the VSCF generation system 12, the power bus 14 and AC loads 16 that receive AC power form the power bus 14. The VSCF generation system 12 includes a variable frequency (VF) generator 201 and a VSCF converter 202. The VSCF converter 202 includes controls unit 206 and an overload control 204. In embodiments, the VSCF converter 202 and the controls unit 206 are integrated, e.g., provided on the same integrated circuit or are disposed in the same housing. In embodiments, the controls unit 206 is external to the VSCF converter 202, e.g., wherein the VSCF converter 202 and the controls unit 206 are provided on different integrated circuits or are disposed in different housings. In embodiments, the overload control 204 is integrated with the VSCF converter 202 and/or the controls unit 206. In embodiments, the overload control 204 is external to the VSCF converter 202 and the controls unit 206.

The generator 201 receives a variable-speed motive power, such as a rotating shaft 18a, and converts the motive power into a variable-frequency AC power that is output to the VSCF converter 202. The generator 201, converts mechanical energy into an AC electrical signal by applying electromagnetic induction, which induces voltage by a changing magnetic field. The variable-frequency AC power can be output in one or more phases, and is shown in the example of FIG. 2 as three phases. The rotating shaft 18a can be, for example, a mechanical drive rotating shaft that rotates at rates that can vary over time between, for example, 2:1 revolutions per minute (rpm)—3:1 rpm. The variable-frequency AC power phase signals can have varying frequency and a steady voltage, for example 200V. For example, the frequency can vary between 1200 Hz-2700 Hz. One skilled in the art will recognize that in different applications, the rotation rate of rotating shaft 18a and the voltage and frequency of the variable-frequency AC power phase signals can have different values.

The VSCF converter 202 includes an alternating current (AC) input, direct current (DC) stage which converts the variable frequency AC power into a DC voltage. The AC/DC stage is shown in the example of FIG. 2 to include a rectifier 220 and a DC filter 222. The rectifier 220 can include a rectifier circuit 220A, which can include, for example a diode. The DC filter 222 can include a DC filter circuit 222A, which can include for example, one or more capacitors.

The VSCF converter 202 further includes a DC/AC stage that converts the DC voltage into a fixed frequency AC power that can be output to power bus 14 for use by the AC loads 16. A point of regulation (POR) voltage V_POR is regulated to a constant RMS value and constant frequency to the output via power bus 14 to the loads, wherein current I_POR is the current drawn by the AC loads 16. The DC/AC stage is shown in the example of FIG. 2 to include an inverter 224 and an AC filter 226. The inverter 224 can include an inverter circuit 224A, which can include, for example, semiconductor switches connected to respective antiparallel diodes. The AC filter 226 can include an AC filter circuit 226A, which can include, for example, an LC circuit.

Overload controller 204 responds to an abnormal overload condition by decreasing the DC voltage. The abnormal overload condition can be associated with a determination that a sensed AC current flowing through or from the DC/AC stage has exceeded a predetermined limit. The overload controller 204 can decrease the DC voltage by controlling the generation of the variable frequency AC current. Overload controller 204 can be included in controls unit 206 or can be external from controls unit 206.

In the example shown, the controls unit 206 includes a generator control 230, an inverter control 232, a V_DC comparator 250, an I_AC comparator 252, and a V_AC comparator 254. The controls unit 206 further receives measured electrical characteristics of the VSCF converter 202. In particular, the V_DC comparator 250 receives V_Sensed_DC from DC voltage sense 240 that senses and measures the DC voltage after it is operated on by at least rectifier 220. In the example shown, DC voltage sense 240 senses and measures the DC voltage after it is operated on by the DC filter 222 as well.

The I_AC comparator 252 receives I_Sensed_AC from AC current sense 242 that senses and measures the AC current after it is operated on by at least inverter 224. In embodiments, AC current sense 242 can sense and measure the AC current after it is operated on by the AC filter 226 as well.

The V_AC comparator 254 receives V_Sensed_AC from AC voltage sense 244 that senses and measures the AC voltage after it is operated on by at least inverter 224. In the example shown, AC voltage sense 244 senses and measures the AC voltage after it is operated on by the AC filter 226 as well.

The AC current sense 242 and the AC voltage sense 244 obtain measurements from locations included in the VSCF converter 202 or from positions along the power bus 14 that are external to the VSCF converter 202. Each of DC voltage sense 240, AC current sense 242, and AC voltage sense 244 can be included in or be positioned external to VSCF converter 202 and/or controls unit 206. Overload control 204, generator control 230, inverter control 232, V_DC comparator 250, I_AC comparator 252, and V_AC comparator 254 can be implemented as hardware, firmware, software, or any combination of these, such as using a field programmable gate array (FPGA), an application specific integrated circuit (ASIC), a system on a chip (SOC), a programmable SOC (PSOC), a processor, etc.

Figure 4:
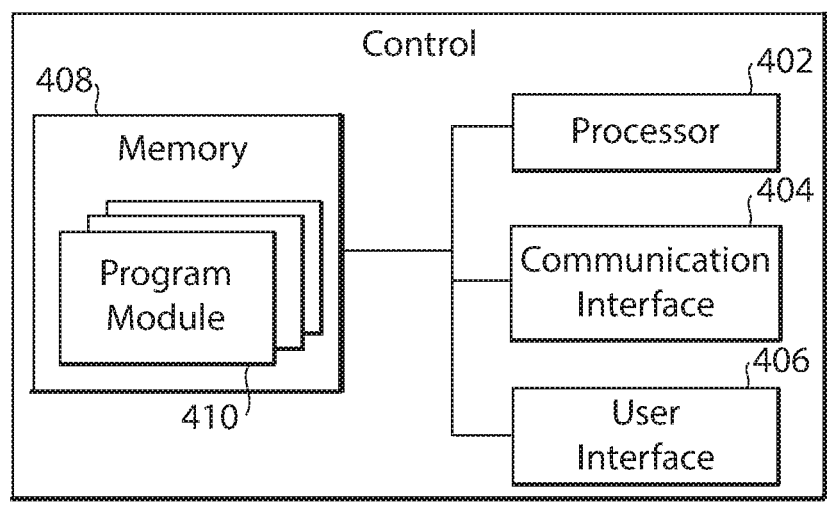
FIG. 4 shows a block diagram of an exemplary control in accordance with the present disclosure.

FIG. 4 shows an embodiment of a control 400 that can be used to implement any of overload control 204, generator control 230, inverter control 232, V_DC comparator 250, I_AC comparator 252, and V_AC comparator 254. Controller 400 includes a processor 402, a communications interface 404, an optional user interface 406, and a memory 408. Memory 408 includes a non-transitory machine readable medium having a plurality of program modules 410 recorded on it that, when read by processor 402, cause control 400 to execute certain actions. Among those actions are operations of a method (shown in FIG. 5) of controlling the VSCF converter 202, as will be described.

In embodiments, overload control 204 communicates with any of generator control 230, inverter control 232, V_DC comparator 250, I_AC comparator 252, V_AC comparator 254, DC voltage sense 240, AC current sense 242, and AC voltage sense 244, such as via physical or wireless communication links. In embodiments, overload control 204 includes any of generator control 230, inverter control 232, V_DC comparator 250, I_AC comparator 252, V_AC comparator 254, DC voltage sense 240, AC current sense 242, and AC voltage sense 244.

V_DC comparator 250 receives V_SensedDC, which is the DC voltage that is sensed by DC voltage sense 240, and compares V_SensedDC to a reference voltage V_DC_REF. The output of V_DC comparator 250 indicates whether V_SensedDC is equal to, exceeds, or is below V_DC_REF. Generator control 230 provides a control signal I_EFC to VF generator 201 to control operation of the VF generator 201 based on the result output by the V_DC comparator 250. The DC voltage V_DC is thus regulated to be at a predetermined fixed voltage level by a DC voltage control loop that includes DC voltage sense 240, V_DC comparator 250, generator control 230, VF generator 201, rectifier 220, and DC filter 222. However, as described in greater detail below, the DC voltage control loop is integrated with an AC current control loop for controlling the DC voltage to be regulated based on detection of an overload condition.

In a conventional electrical system, the DC voltage V_DC is regulated to be at a predetermined fixed voltage level by the DC voltage control loop that includes DC voltage sense 240, V_DC comparator 250, generator control 230, VF generator 201, rectifier 220, and DC filter 222. The DC voltage level can be required by design to be at the predetermined fixed voltage level in order to insure the VSCF converter delivers a rated voltage at the POR on the AC power bus where AC bus loads are coupled to the AC power bus. In such a conventional electrical system, the DC voltage remains unchanged over the output current range of the VSCF converter. The DC voltage is unaffected by the level of current output by the VSCF converter. Rather, the current output by the VSCF converter is controlled by an AC current loop that is separate from the DC voltage control loop.

Figure 3:
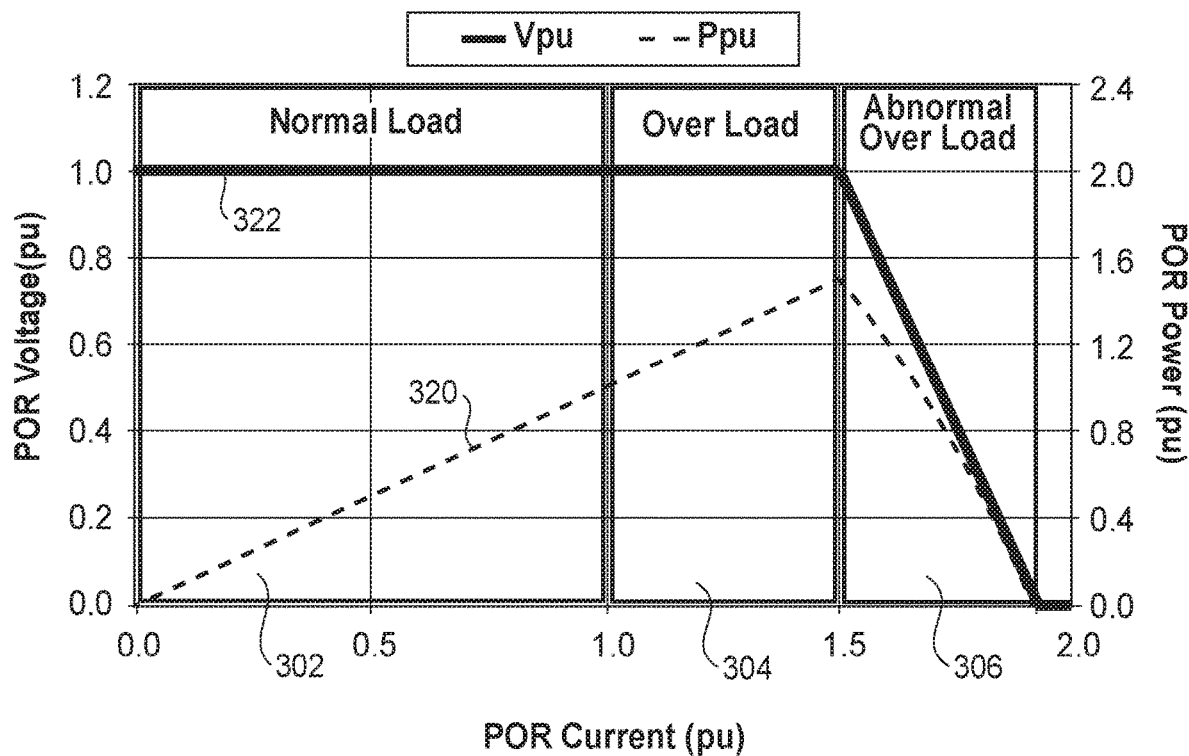
FIG. 3 shows an exemplary plot 300 of a normal rated voltage Vpu and normal rated power Ppu versus a normal rated current Ipu delivered from a VSCF to an AC load.

With reference to FIG. 3, a plot 300 is provided of a normal rated voltage POR Vpu and normal rated power POR Ppu versus a normal rated current POR Ipu delivered from a conventional VSCF to an AC load on a per unit basis, wherein:

$Ipu=I\_POR/Irated$, for I_POR=output AC current at the POR, Irated=a rated current for proper operation of AC loads;

$Vpu=V\_POR/Vrated$, for V_POR=output AC voltage at the POR, Vrated=a rated voltage for proper operation of AC loads;

$Ppu=P\_POR/Prated$, for P_POR=output power at the POR, Prated=a rated power for proper operation of AC loads;

Plot 300 includes a normal region 302, in which Ppu≤1.0, an overload region 304 in which 1≤PPU≤1.5, and an abnormal region 306 in which 1.5≤PPU≤2. Curve 320 is plot of Ppu, and curve 322 is a plot of Vpu, showing behavior of the conventional VSCF in the normal, overload, and abnormal overload regions 302, 304, and 306.

The conventional VSCF can have associated load requirements in which Vpu is required to be maintained steady for 5 to 10 seconds when operating in the overload region 304 to provide for continuous operation of loads. However, when operating in the abnormal overload region 306, the conventional VSCF is allowed to reduce Vpu as a function of Ipu, which will cause Vpu to be reduced to zero volts upon a short circuit condition that represents an extreme theoretically zero ohm resistance load between any phase of the output power to ground or any phase to phase of the output power.

However, aircraft electrical utility busses have requirements for the VSCF to deliver the current and voltage for periods of 3-10 seconds when operating in the abnormal overload region 306 to insure clearing (meaning opening) of downstream circuit breakers in the event of a fault of one or more of the three phases of power bus 14 or a phase to phase fault.

Provision of current and voltage when operating in the abnormal overload region 306 can be problematic, however, since operating temperatures for power switches of inverter 134 can reach abnormally high temperatures, which can even reach a worst case maximum. Operating temperatures of power switches of inverter 134 are a function of power switch losses, which in turn are a function of output current I_POR delivered to the power bus 14, the DC voltage, and switching frequency of power switches of inverter 134.

In accordance with the present disclosure, overload control 204 recognizes when the VSCF converter 202 is operating in the abnormal overload region 306 and in response lowers the DC voltage as a function of I_POR. Lowering the DC voltage as a function of I_POR reduces maximum operating temperatures of the power switches of inverter 134. The amount that DC voltage can be lowered is a function of the ability of VSCF converter 202 to extend the Vpu curve 322 into the abnormal current region and a maximum current that can be delivered by the VF generator 201 to the VSCF converter 202.

I_AC comparator 252 receives I_SensedAC, which is the AC current that is sensed by AC current sense 242, and compares I_SensedAC to a current limit I_CURRENT_LIMIT. The output of I_AC comparator 252 indicates whether I_SensedAC is equal to, exceeds, or is below I_CURRENT_LIMIT. Inverter control 232 controls operation of the inverter 224, such as by controlling switching frequency of power switches of the inverter 224 based on the result output by the I_AC comparator 252.

V_AC comparator 254 receives V_SensedAC, which is V_POR that is sensed by AC voltage sense 244, and compares V_SensedAC to a reference voltage V_AC_REF. The output of V_AC comparator 254 indicates whether V_SensedAC is equal to, exceeds, or is below V_AC_REF. Inverter control 232 controls operation of the inverter 224 based on the result output by the V_AC comparator 254.

The inverter 224 is thus controlled using the AC current control loop and an AC voltage control loop. The AC current control loop includes AC current sense 242, I_AC comparator 252, inverter control 232, and inverter 224. The AC voltage control loop includes AC voltage sense 244, V_AC comparator 254, inverter control 232, and inverter 224. The AC current control loop and the AC voltage control loop overlap each other at the inverter control 232 and thus affect one another.

The overload control 204 also receives output from I_AC comparator 252. The output of the I_AC comparator 252 indicates when I_SensedAC exceeds I_CURRENT_LIMIT, meaning that the VSCF converter 202 is operating in the abnormal overload region 306. In response to detection by the overload control 204 that the VSCF converter 202 is operating in the abnormal overload region 306, the overload control 204 adjusts the value of V_DC_REF that is used by the V_DC comparator 250 when comparing to V_SensedDC. The adjustment can lower the value of V_DC_REF, which will cause the generator control 230 to control operation of the VF generator 201 to reduce the DC voltage that is input to the inverter 224. The reduced DC voltage will reduce the operating temperature of the power switches of inverter 224 and reduce stress on the inverter 224. The reduced DC voltage will further affect the level of current I_Inverter output by the inverter 224 and sensed by AC current sense 242 as I_SensedAC, as well as V_SensedAC voltage sensed by AC voltage sense, thus affecting the AC current control loop and the AC voltage control loop. Throughout the lowering of DC voltage the AC Current control will maintain the desired current at the POR.

The DC voltage V_DC is thus regulated to be at a predetermined fixed voltage level by a DC voltage control loop that includes DC voltage sense 240, V_DC comparator 250, generator control 230, VF generator 201, rectifier 220, and DC filter 222. However, as described in greater detail below, the DC voltage control loop is integrated with an AC current control loop for controlling the DC voltage to be regulated based on detection of an overload condition.

The DC voltage control loop is integrated with the AC current control loop, since overload control 204 receives the output of I_AC comparator 252 that is included in the AC current control loop, wherein the output of the I_AC comparator 252 is processed for determining whether to control an input to the DC voltage control loop, namely V_DC_REF.

Figure 5:
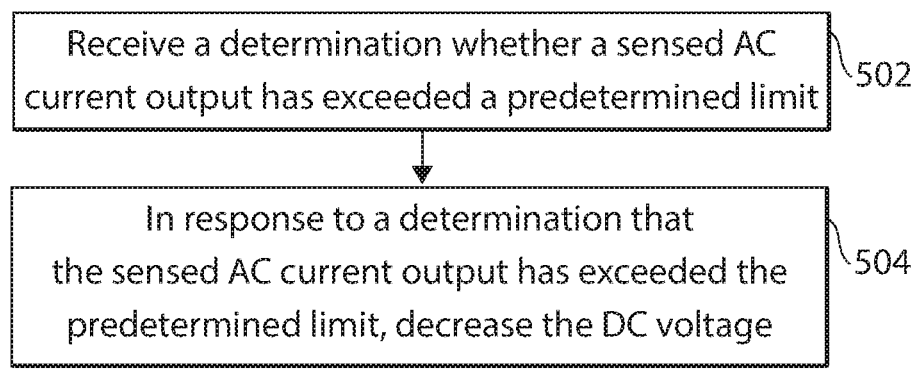
FIG. 5 is a flowchart of an exemplary method of controlling a VSCF converter showing operations of the method.

FIG. 5 shows a flowchart 500 that illustrates an example method performed by an overload control, such as overload control 204 shown in FIG. 2. At operation 502, a determination that a sensed AC current output (such as I_Inverter or I_POR) has exceeded a predetermined limit (such as I_CURRENT_LIMIT), is received. The AC current output has been being converted from a DC voltage and has a constant frequency. The DC voltage has been converted from a variable frequency AC voltage. The variable frequency AC voltage has been generated in response to a mechanical energy input having a varying parameter.

At operation 504, in response to a determination that the sensed AC current output has exceeded the predetermined limit, the DC voltage is decreased. For example, decreasing the DC voltage can include adjusting a voltage reference signal, such as V_DC_REF, wherein the voltage reference signal is compared to the DC voltage as sensed after being converted from a variable frequency AC voltage and before being converted into the AC output. Generation of the variable frequency AC voltage is controlled based on a result of the comparison.

In embodiments, the method can further include receiving the sensed DC voltage, and comparing the DC voltage to the voltage reference signal. In embodiments, the method can include controlling generation of the variable frequency AC voltage based on a result of the comparison.

In embodiments, the method can include receiving the sensed AC current output and comparing in a first comparison the sensed AC current output to the predetermined limit for determining whether the sensed AC current output has exceeded the predetermined limit.

In embodiments, the method can include can include receiving a sensed AC voltage, such as V_SensedAC, which has been sensed after conversion to the constant frequency AC current and before provision to an AC load. The method can further include comparing in a second comparison the sensed AC voltage to an AC voltage reference signal, such as V_AC_REF and controlling conversion of the DC voltage into the AC output based on at least one of the first and second comparisons.

The embodiments described herein are exemplary. Modifications, rearrangements, substitute processes, etc. may be made to these embodiments and still be encompassed within the teachings set forth herein. One or more of the steps, processes, or methods described herein may be carried out by one or more processing and/or digital devices, suitably programmed, and/or by hardware or firmware, such as an FPGA, an ASIC, a programmable logic device, discrete gate or transistor logic components, discrete hardware components, or any combination thereof designed to perform the functions described herein The methods and systems of the present disclosure, as described above and shown in the drawings, provide for controlling a VSCF converter with superior properties including controlling the DC voltage via a control loop as a function of an abnormal overload current. Switching device losses of the VSCF converter are proportional to the DC voltage. Accordingly, reduction of the DC voltage can minimize temperature stress on the VSCF converter. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of controlling a variable speed constant frequency (VSCF) power converter, the method comprising:
   receiving a determination that a sensed AC current output has exceeded a predetermined limit, the AC current output being converted from a DC voltage and having a constant frequency, the DC voltage being converted from a variable frequency AC voltage, the variable frequency AC voltage being generated in response to a mechanical energy input having a varying parameter; and
   in response to a determination that the sensed AC current output has exceeded the predetermined limit, decreasing the DC voltage,
   wherein decreasing the DC voltage includes adjusting a voltage reference signal, wherein the voltage reference signal is compared to the DC voltage as sensed after being converted from the variable frequency AC voltage and before being converted into the AC output, and generation of the variable frequency AC voltage is controlled as a function of a result of the comparison.

2. The method of claim 1, wherein decreasing the DC voltage includes controlling generation of the variable frequency AC voltage.

3. The method of claim 1, further comprising:
   receiving the sensed DC voltage; and
   comparing the DC voltage to the voltage reference signal.

4. The method of claim 1, further comprising controlling generation of the variable frequency AC voltage as a function of a result of the comparison.

5. A method of controlling a variable speed constant frequency (VSCF) power converter, the method comprising:
   receiving a sensed AC current output;
   comparing in a first comparison the sensed AC current output to the predetermined limit for determining whether the sensed AC current output has exceeded the predetermined limit;
   receiving a determination that the sensed AC current output has exceeded a predetermined limit, the AC current output being converted from a DC voltage and having a constant frequency, the DC voltage being converted from a variable frequency AC voltage, the variable frequency AC voltage being generated in response to a mechanical energy input having a varying parameter; and
   in response to a determination that the sensed AC current output has exceeded the predetermined limit, decreasing the DC voltage.

6. The method of claim 5, further comprising:
   receiving a sensed AC voltage sensed after conversion to the constant frequency AC current and before provision to an AC load;
   comparing in a second comparison the sensed AC voltage to an AC voltage reference signal; and
   controlling conversion of the DC voltage into the AC current output as a function of at least one of the first and second comparisons.

7. The method of claim 1, wherein the predetermined limit is exceeded when the AC current output is more than approximately 1.5 a rated current level that is rated for a load coupled to a load bus that receives the AC current output.

8. A variable speed constant frequency power (VSCF) converter comprising:
   an AC/DC conversion stage configured to a receive variable frequency AC voltage and convert the variable frequency AC voltage to a DC voltage;
   a DC/AC conversion stage configured to convert the DC voltage into an AC current output having a constant frequency; and
   a controller configured to:
      receive a sensed AC current output from sensing of the AC current output;
      determine whether the sensed AC current output exceeded a predetermined limit; and
      in response to a determination that the sensed AC current output has exceeded the predetermined limit, decreasing the DC voltage,
      wherein decreasing the DC voltage includes adjusting a voltage reference signal, wherein the voltage reference signal is compared to a the DC voltage as sensed after being converted from the variable frequency AC voltage and before being converted into the AC output, and generation of the variable frequency AC voltage is controlled as a function of a result of the comparison.

9. The VSCF converter of claim 8, further comprising a variable frequency generator configured to output variable frequency signals, wherein decreasing the DC voltage includes controlling generation of the variable AC voltage by the variable frequency generator.

10. The VSCF converter of claim 8, further comprising a first comparator configured to receive a sensed DC voltage from sensing the DC voltage and to compare the sensed DC voltage to the voltage reference signal.

11. The VSCF converter of claim 8, further comprising a generator control that controls generation of the variable frequency AC voltage as a function of a result of the comparison.

12. A variable speed constant frequency power (VSCF) converter comprising:
   an AC/DC conversion stage configured to receive variable frequency AC voltage and convert the variable frequency AC voltage to a DC voltage;
   a DC/AC conversion stage configured to convert the DC voltage into an AC current output having a constant frequency; and
   a controller configured to receive a sensed AC current output, wherein the controller comprises a first comparator configured to receive the sensed AC current output and compare the sensed AC current output to the predetermined limit for determining whether the sensed AC current output has exceeded the predetermined limit, the controller further configured to, in response to a determination that the sensed AC current output has exceeded the predetermined limit, decrease the DC voltage.

13. The VSCF converter of claim 12, further comprising a second comparator configured to receive a sensed AC voltage that was sensed after conversion to the constant frequency AC current and before provision to an AC load, and further configured to compare the sensed AC voltage to an AC voltage reference signal, wherein the DC/AC stage is controlled as a function of results determined by at least one of the first and second comparators.

14. A controller for controlling a variable speed constant frequency power (VSCF) converter, the controller comprising:
    processing circuits configured to:
        receive a determination that a sensed AC current output has exceeded a predetermined limit, the AC current output being converted from a DC voltage and having a constant frequency, the DC voltage being converted from a variable frequency AC voltage, the variable frequency AC voltage being generated in response to a mechanical energy input having a varying parameter; and
        in response to a determination that the sensed AC current output has exceeded the predetermined limit, decrease the DC voltage,
    wherein decreasing the DC voltage includes adjusting a voltage reference signal, wherein the voltage reference signal is compared to the DC voltage as sensed after being converted from the variable frequency AC voltage and before being converted into the AC output, and the generation of the variable frequency AC voltage is controlled as a function of a result of the comparison.

15. The controller of claim 14, wherein decreasing the DC voltage includes controlling generation of the variable frequency AC voltage.

16. The controller of claim 14, wherein the processing circuits are further configured to:
    receive the sensed DC voltage; and
    compare the DC voltage to the voltage reference signal.

17. The controller of claim 16, wherein the processing circuits are further configured to control generation of the variable frequency AC voltage as a function of a result of the comparison.

* * * * *